United States Patent
Aoyagi et al.

(10) Patent No.: US 9,136,961 B2
(45) Date of Patent: Sep. 15, 2015

(54) COMMUNICATION DEVICE AND INFORMATION COLLECTING METHOD

(75) Inventors: Kenichiro Aoyagi, Tokyo (JP); Anil Umesh, Tokyo (JP); Wuri Andarmawanti Hapsari, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 205 days.

(21) Appl. No.: 13/982,941

(22) PCT Filed: May 18, 2012

(86) PCT No.: PCT/JP2012/062877
§ 371 (c)(1),
(2), (4) Date: Jul. 31, 2013

(87) PCT Pub. No.: WO2012/165183
PCT Pub. Date: Jun. 12, 2012

(65) Prior Publication Data
US 2013/0309959 A1    Nov. 21, 2013

(30) Foreign Application Priority Data

May 30, 2011 (JP) .................................. 2011-120839

(51) Int. Cl.
*H04H 20/44* (2008.01)
*H04H 20/59* (2008.01)
(Continued)

(52) U.S. Cl.
CPC ............... *H04H 20/59* (2013.01); *H04W 4/06* (2013.01); *H04W 4/22* (2013.01)

(58) Field of Classification Search
CPC ............................. H04H 20/44; H04H 40/00
USPC .............. 455/3.01, 3.03, 414.1, 412.1, 412.2, 455/420, 515, 67.11; 725/33, 82
See application file for complete search history.

(56) References Cited

U.S. PATENT DOCUMENTS 7,457,582 B2 * 11/2008 Kamada et al. ............... 455/3.01
2009/0017791 A1 * 1/2009 Besson ......................... 455/411
(Continued)

FOREIGN PATENT DOCUMENTS

EP     1746854 A1    1/2007
JP     2007-214893 A  8/2007
(Continued)

OTHER PUBLICATIONS

Extended European Search Report in corresponding European Application No. 12793456.0, dated Oct. 31, 2014 (7 pages).
(Continued)

*Primary Examiner* — John J Lee
(74) *Attorney, Agent, or Firm* — Osha Liang LLP (57) ABSTRACT

A communication device includes a receiving unit configured to receive an instruction signal, which instructs the keeping of records regarding specific broadcast information, from a transmission source of the specific broadcast information, a storing unit configured to retain the records regarding the specific broadcast information in the case where the receiving unit receives the specific broadcast information broadcast from the transmission source, and a transmission unit configured to transmit to the transmission source a notification signal indicating that the records regarding the specific broadcast information are retained, wherein in the case where the receiving unit receives a request signal sent from the transmission source in response to the notification signal, the transmission unit transmits to the transmission source a reporting signal including at least an identifier identifying the specific broadcast information.

8 Claims, 5 Drawing Sheets

(51) Int. Cl.
*H04W 4/22* (2009.01)
*H04W 4/06* (2009.01)

(56) References Cited

U.S. PATENT DOCUMENTS

2009/0199232 A1* 8/2009 Takeyama et al. .............. 725/33
2009/0322964 A1* 12/2009 Yamamura et al. ........... 348/731

FOREIGN PATENT DOCUMENTS

JP 2010-288101 A 12/2010
WO 2011019938 A1 2/2011

OTHER PUBLICATIONS

International Search Report for International Application No. PCT/JP2012/062877 mailed Jun. 19, 2012 (4 pages).
Written Opinion for International Application No. PCT/JP2012/062877 mailed Jun. 19, 2012 (3 pages).
3GPP TS 25.331 V8.14.0; "ETWS primary notification with security procedure; (Release 8)"; Mar. 2011, pp. 151-154 (2 pages).
3GPP TS 36.331 V8.13.0; "Indication of ETWS notification; (Release 8)"; Mar. 2011, p. 22 (1 page).
Office Action in corresponding Japanese Application No. 2011-120839 dated Jul. 2, 2013 (8 pages).

* cited by examiner

COMMUNICATION DEVICE AND INFORMATION COLLECTING METHOD

TECHNICAL FIELD

The present invention relates to a communication device and an information collecting method.

BACKGROUND ART

There are technologies for notifying users of emergency information through mobile phones when a disaster such as an earthquake occurs. Specific examples of such technologies are a Cell Broadcast Service (CBS) or an Earthquake and Tsunami Warning System (ETWS). Regarding this aspect, it is described in non-patent documents 1 and 2.

RELATED ART DOCUMENT

[NON-PATENT DOCUMENT 1] 3GPP TS25.331 v8.14.0 (March 2011), §8.1.17
[NON-PATENT DOCUMENT 2] 3GPP TS36.331 v8.13.0 (March 2011), §5.2.1.4

SUMMARY OF THE INVENTION

Problem to be Solved by the Invention

In the case of a conventional method for notifying users of emergency information, a transmission source, such as a base station, broadcasts the emergency information to users. In the case of a broadcast type of communications like this, transmission-confirming information such as an ACK or a NACK is not sent from each user equipment to the transmission source. Because of this, the transmission source, which has sent the emergency information, is unable to know if it has properly sent the emergency information to all the users or not. This is not desirable from the view point of properly constructing communication areas for the users. Emergency information is typically sent at the time of natural disasters, but it may be sent not only at the time of natural disasters but also in human-caused situations such as international conflicts.

The problem to be solved by the present invention is to make it possible for a transmission source to analyze what extent of user equipments were able to properly receive the emergency information (in a more generic term, "broadcast information") that was broadcast from the transmission source to the user equipments in a specific area.

Means for Solving the Problem

A communication device according to an embodiment of the present invention is a communication device including a receiving unit configured to receive an instruction signal instructing the keeping of records regarding specific broadcast information from a transmission source of the specific broadcast information, a memory unit configured to retain records regarding the specific broadcast information in the case where the receiving unit receives the specific broadcast information broadcast from the transmission source, and a transmission unit configured to transmit a notification signal indicating that the records regarding the specific broadcast information are retained, wherein in the case where the receiving unit receives a request signal sent from the transmission source in response to the notification signal, the transmission unit transmits to the transmission source a reporting signal including at least an identifier identifying the specific broadcast information.

Effect of the Present Invention

According to an embodiment of the present invention, it becomes possible for a transmission source to analyze what extent of user equipments were able to properly receive the broadcast information that was broadcast from the transmission source to the user equipments in a specific area.

EMBODIMENTS FOR CARRYING OUT THE INVENTION

Embodiments of the present invention will be described from the following aspects.
1. Communication system
2. Operation examples
3. Transmission source communication device
4. User equipment
5. Modified embodiments

Present Embodiment 1

1. Communication System

Figure 1:
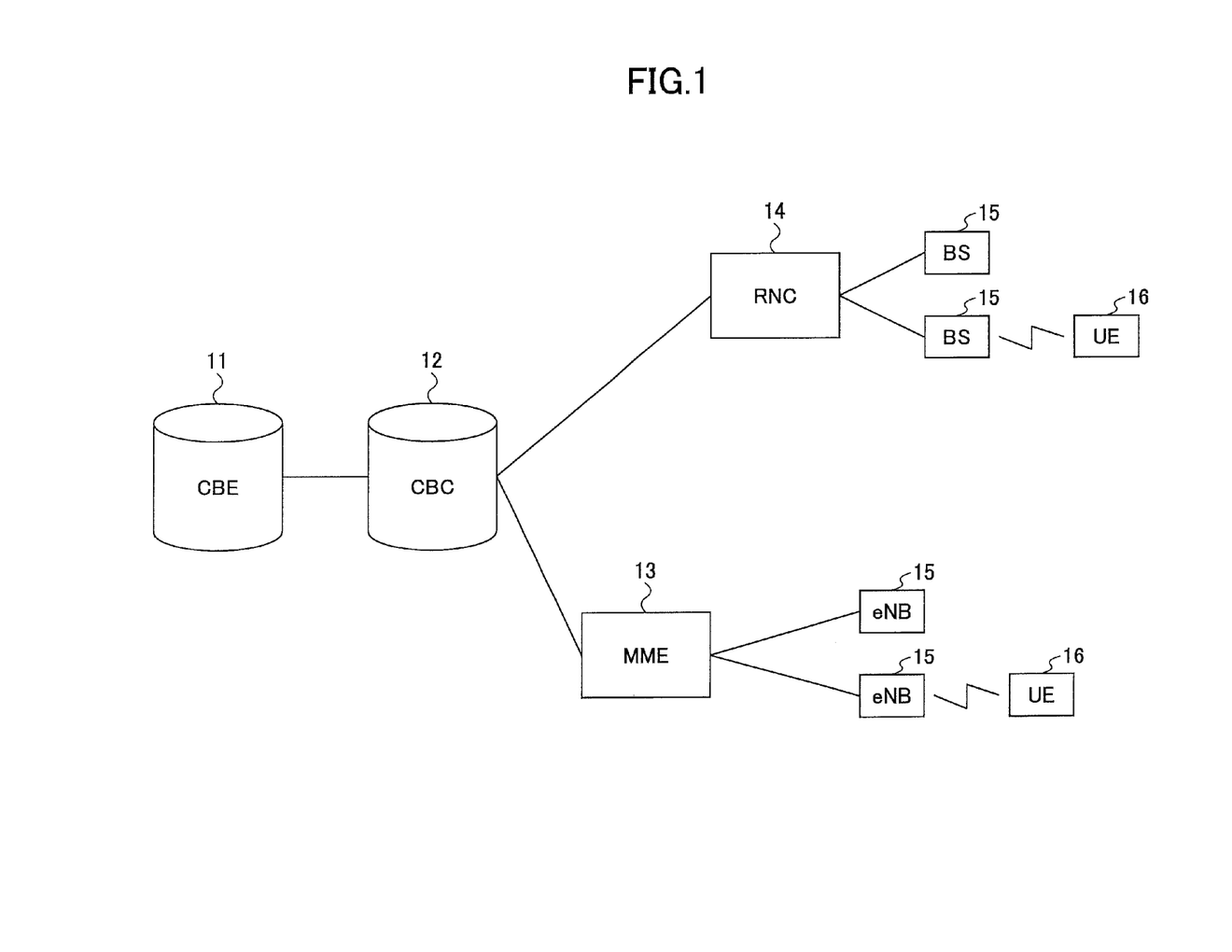
FIG. 1 is a drawing illustrating a communication system that can be used in an embodiment of the present invention.

FIG. 1 shows a communication system that can be used in an embodiment of the present invention. Of various nodes included in a communication system, nodes especially related to the present embodiment are shown in FIG. 1. The communication system includes at least a Cell Broadcast Entity CBE 11, a Cell Broadcast Center CBC 12, a switching center MME 13, a Radio Network Controller RNC 14, a LTE-system base station eNB 15, a 3G-system base station BS (or NodeB) 15, and a user equipment 16.

The Cell Broadcast Entity (CBE) 11 is an information source that provides information such as emergency information at the time of a disaster. To be more precise, a meteorological agency, etc. corresponds to the CBE.

The Cell Broadcast Center (CBC) 12, based on the information provided by the CBE 11, generates broadcast information that is actually broadcast to user equipments. The CBC 12, based on the information provided by the CBE 11, may determine an area in which the broadcast information is broadcast. For example, in the case where an earthquake occurs, an area, in which there is a concern for a tsunami risk, may be specifically specified.

The switching center MME 13 in general performs call processing for a user equipment. For example, regarding user equipments in an LTE scheme mobile communication system, the switching center MME 13 performs subscriber information management, mobility management, outgoing/incoming call control, charging control, QoS control, etc. The switching center MME 13 in the present embodiment transfers broadcast information indicating emergency information to base stations in an area specified by the CBC 12.

The Radio Network Controller RNC 14 in general performs call processing for a user equipment. For example, regarding user equipments in a third generation mobile communication system, the Radio Network Controller RNC 14 performs subscriber information management, mobility management, outgoing/incoming call control, charging control, QoS control, etc. The Radio Network Controller RNC 14 in the present embodiment transfers broadcast information indicating emergency information to base stations in an area specified by the CBC 12.

The LTE-system base station eNB 15 is a base station in an LTE scheme mobile communication system. The base station eNB 15 performs, for example, radio resource allocation control in the case where the base station eNB 15 performs radio communication with user equipments 16.

The 3G-system base station BS (or NodeB) 15 is a base station in a third generation scheme mobile communication system.

The user equipment 16 may be any appropriate communication device as long as it is capable of receiving emergency information as in an ETWS in addition to enabling a user to communicate wirelessly in one of, or in both of, an LTE scheme mobile communication system and a third generation scheme mobile communication system. The user equipment is typically a mobile phone, but may be another device. For example, the user equipment may be an information terminal, an advanced mobile phone, a smart phone, a tablet type computer, a personal digital assistant, a portable personal computer, a palm top computer, a laptop computer, a desk top computer, etc.

In FIG. 1, for the sake of simplicity, only a third generation scheme mobile communication system and an LTE scheme mobile communication system are illustrated, but other communication systems may be included. For example, an LTE-advanced scheme mobile communication system may be included.

2. Operation Examples

Figure 2:
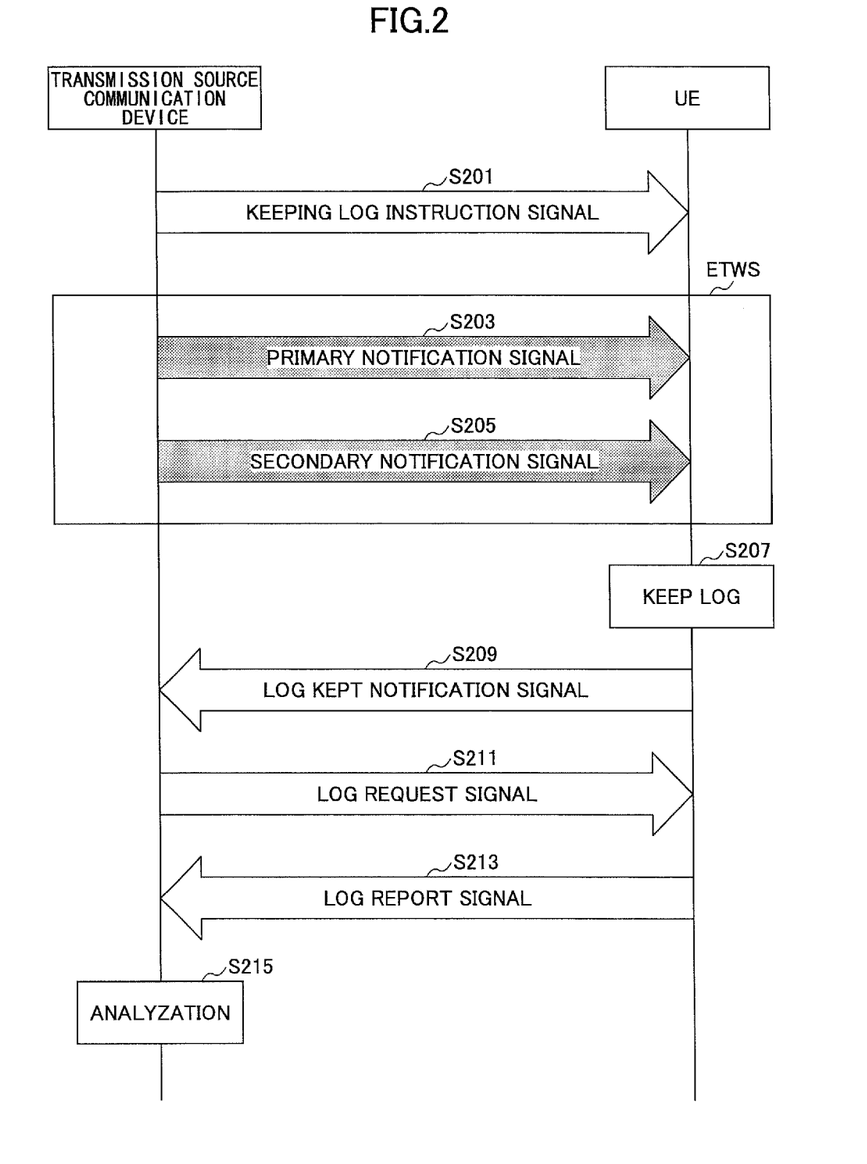
FIG. 2 is a sequence diagram illustrating an operation example.

FIG. 2 is an operation example illustrating operations performed between a transmission source communication device and a user equipment in the communication system shown in FIG. 1. In the case of an LTE scheme mobile communication system, the transmission source communication device is typically a base station eNB 15, but may be a switching center MME 13 or a certain information control server (not shown in the figure), etc. In the case of a third generation scheme mobile communication system, the transmission source communication device is typically a Radio Network Controller RNC 14, but may be a switching center (not shown in the figure) or a certain information control server (not shown in the figure), etc. As an example, the case where RRC messages by MDT (Minimization of Drive Tests) is used, will be described, but embodiments are not limited to this embodiment.

In step S201, a transmission source communication device (e.g. base station) sends an instruction signal to a user equipment. The instruction signal is a signal instructing the user equipment to keep records regarding the broadcast information specified by the transmission source communication device in the case where the user receives it. A disaster may have not occurred yet when step S201 is performed, or the step S201 may be performed at the same time as information broadcasting steps of S203 and S205 associated with an occurrence of a disaster are performed. The transmission source communication device may send the instruction signal along with conditions specifying the area, time, contents, etc. The user equipment keeps records in the case where the conditions are met. For example, the instruction signal may be sent to user equipments residing in a specific area. In this case, a user equipment residing in that specific area keeps records when it receives the broadcast information, but a user equipment residing in a different area does not keep records even when it receives the broadcast information. Also, the instruction signal may specify a specific period, and a user equipment may keep records in the case where it receives the broadcast information during that specific period. Furthermore, the instruction signal may specify a specific content (tsunami, etc.), and a user equipment may keep records in the case where it receives the broadcast information of that specific content. In the case where MDT messages are available, step S201 can be implemented by the message "LOGGED MEASUREMENT CONFIGURATION".

Note that the transaction of the instruction signal of step S201 may be performed when the user equipment is in a state where a connection is not established (idle state), or may be performed during the time when the connection is being established.

Suppose that a disaster such as an earthquake occurs after the instruction signal of step S201 is sent to the user. In this case, a CBE such as a meteorological agency generates emergency information by detecting a minor initial tremor of a P wave (Primary Wave), and sends it to a Cell Broadcast Center CBC, and the CBC identifies a broadcast area and generates actual broadcast information to be broadcast. And the broadcast information reaches the transmission source communication device.

In step S203, the transmission source communication device broadcasts to user equipments a primary notification signal including a minimum information portion such as an "earthquake", a "tsunami", or an "earthquake and tsunami". In the case of an ETWS of an LTE scheme mobile communication system, the primary notification signal is sent to user equipments as a notification signal. In the case of the third generation scheme mobile communication system, the primary notification signal is sent to user equipments as a paging signal. In either case, it is possible to promptly notify user equipments because the primary notification signal only includes a minimum information portion of the emergency information.

For the sake of convenience of illustration, it is illustrated that the primary notification signal of the ETWS is sent to user equipments after the instruction signal of step S201 is sent to user equipments, but this is not essential for the present embodiment. The instruction signal of step S201 and the primary notification signal of step S203 may be sent at the same time.

In step S205, the transmission source communication device sends a secondary notification signal to user equipments. The secondary notification signal includes complementary information other than a minimum information portion such as an "earthquake". For example, in the case of an earthquake, information such as an earthquake intensity for each location, an epicenter, etc. is included in the secondary notification signal. In the case of an ETWS of an LTE scheme mobile communication system, the secondary notification signal is sent to user equipments as a notification signal. In the case of a third generation scheme mobile communication system, the primary notification signal is sent to user equipments as system information or a broadcast signal of BMC.

In step S207, a user equipment keeps records (logs) of broadcast information. The records are stored in a memory unit of the user equipment. The user equipment was instructed in step S201 to keep records in the case where it received broadcast information to be received in step S203 or step S205. In the case where some conditions were specified in the instruction signal received by the user equipment in step S201, the user equipment and the broadcast information are supposed to meet the conditions. In the case where the user equipment and the broadcast information do not meet the conditions, it may not be necessary to perform the keeping of records of the broadcast information.

Figure 3:
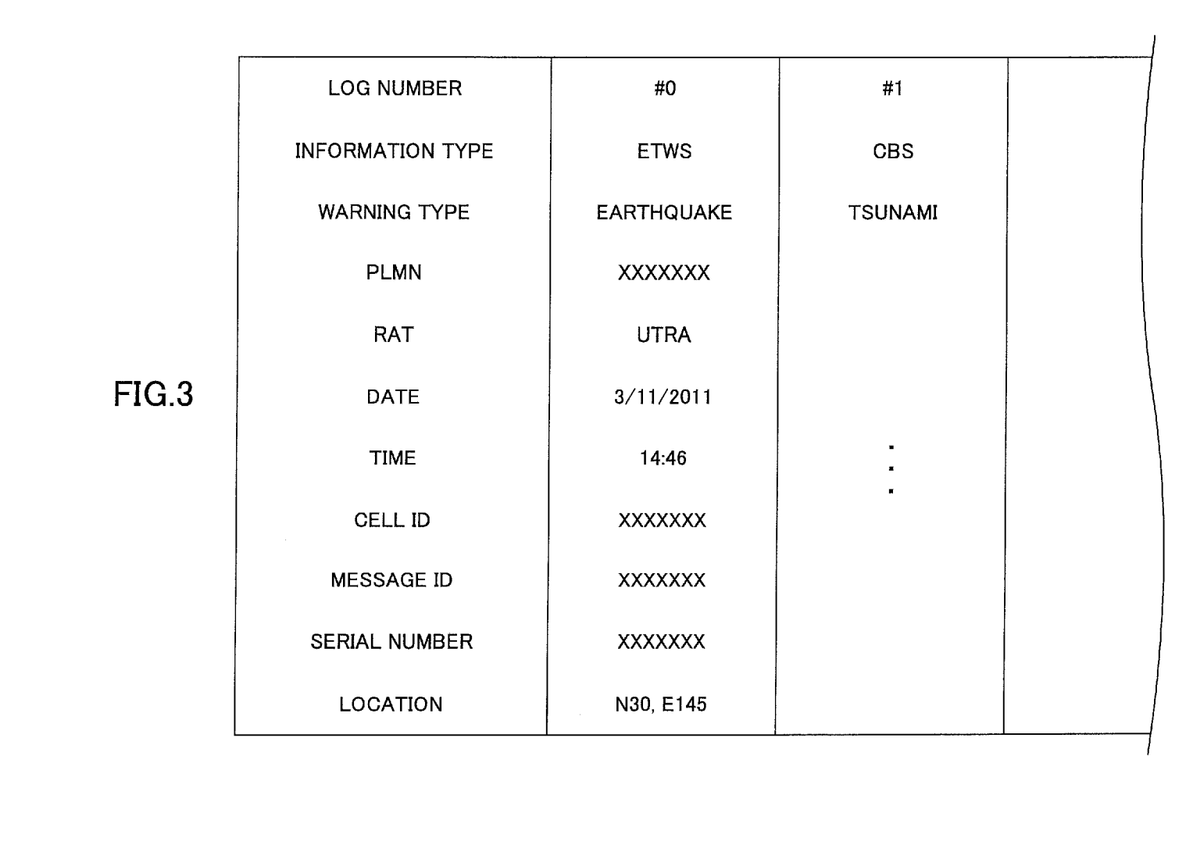
FIG. 3 is a drawing illustrating examples of records that are retained in a user equipment.

FIG. 3 illustrates examples of records (logs) stored in a memory unit of a user equipment. The record (log) may include various informational items. In the case of an example shown in the figure, the recording is performed for each informational item such as a log number, an information type, a warning type, a network (PLMN), a Radio Access Technology (RAT), a date, a time, a cell identifier (cell ID), a message identifier (message ID), a serial number, and location.

The log number is an identification number that is given to each broadcast information when the user equipment keeps a record.

The information type indicates what kind of method the broadcast information is broadcast by. In the case of an example shown in the figure, the broadcast information with log number #0 is one broadcast by the ETWS method, and the broadcast information with log number #1 is one broadcast by the Cell Broadcast Service (CBS) method. In general, whereas, in the ETWS method, emergency information is divided into the primary notification signal and the secondary notification signal, and the primary notification signal is broadcast promptly, in the CBS method, the emergency information is broadcast without performing such an information division.

The warning type indicates a type or a category of broadcast information. In the case of an example shown in the figure, the broadcast information with log number #0 is related to an earthquake, and the broadcast information with log number #1 is related to a tsunami.

The network (PLMN) indicates which communication network (Public Land Mobile Network) the broadcast of the broadcast information is performed in. It may be possible that a name of an operator operating the network is recorded.

The Radio Access Technology (RAT) indicates a Radio Access Technology used in the communication network in which the broadcast of the broadcast information is performed. In an example shown in the figure, the broadcast information with log number #0 is broadcast via a UTRA scheme communication network.

The date indicates a date when the broadcast information is broadcast.

The time indicates a time when the broadcast information is broadcast or when the broadcast information is received by the user equipment.

The cell identifier (cell identity) is an identifier of a cell from which the user equipment receives the broadcast information.

The message ID indicates an information source of the broadcast information. For example, the meteorological agency is specified as a message identifier.

The serial number indicates a version of the broadcast information. For example, the user equipment that receives the broadcast information checks the message identifier and the serial number, and in the case where the user equipment has already received a broadcast information with the same message identifier and the same serial number, the user equipment discards the broadcast information just received. In the case where the user equipment has received a broadcast information with an older serial number, the broadcast information just received is displayed to the user. In the case where the broadcast information is stored, it is overwritten.

The location indicates a location of the user equipment at the time when the broadcast information is received by the user equipment. In an example shown in the figure, the location of 30 degrees north latitude and 145 degrees east longitude is shown. This kind of location information may be determined based on, for example, signals received through a GPS receiver.

Types of informational items are not limited to those illustrated in the figure, but other kinds of informational items may be recorded. For example, informational items to be stored may include contents of the broadcast information. The contents of the broadcast information are, more specifically, ones notified in step S203 and S205 of FIG. 2. Whatever the case may be, in the case where the user equipment receives the specified broadcast information, the user equipment keeps records of the broadcast information. The record of the broadcast information may be referred to as "metadata" for the broadcast information (information accompanying the emergency information).

In step S207 of FIG. 2, suppose that the user equipment tries to access the transmission source communication device at some point after the recording of broadcast information is performed (after a certain elapsed time from step S205). For example, the user equipment tries to establish a connection. In this case, the user equipment accesses a transmission source communication device such as a base station using a common control channel. At this point of an access, the user equipment notifies the transmission source communication device that the user equipment retains records regarding broadcast information (step S209). This notification may be expressed by, for example, a bit that indicates whether records are retained or not. In the case where MDT messages are available, step S209 can be implemented by the message "RRC CONNECTION REQUEST".

In step S211, the transmission source communication device, in response to the notification from the user equipment, requests records retained by the user equipment. In the case where MDT messages are available, step S211 can be implemented by the message "UE INFORMATION REQUEST".

In step S213, the user equipment, in response to the request from the transmission source communication device, sends a reporting signal including one or more of retained informational items to the transmission source communication device. For example, the reporting signal may include a message ID and a serial number because the broadcast information can be identified by these informational items. Or the reporting signal may include, in addition to the message ID and the serial number, any other informational items. More specifically, the reporting signal may include, in addition to the message ID and the serial number, one or more of any other informational items shown in FIG. 3. In the case where MDT messages are available, step S213 can be implemented by the message "UE INFORMATION RESPONSE".

In step S215, the transmission source communication device analyzes records regarding broadcast information collected from various user equipments. For example, suppose that a reporting signal from a user equipment includes a message ID and a serial number. In this case, the user equipment has properly received the broadcast information specified by the message ID and the serial number. Therefore, in step S201 of FIG. 2, in the case where a total number of user equipments that have received the instruction for keeping records of broadcast information is known, by calculating the ratio between the number n of user equipments that have reported and the total number N (n/N), a reception rate of broadcast information can be known. In the case where the reporting signal includes, in addition to the message ID and the serial number, location information (e.g., cell ID, latitude and longitude, etc.), a reception rate for each cell or each location can be known. In the case where the reporting signal includes, in addition to the message ID and the serial number, reception time information, reception rates of broadcast information can be known in chronological order.

The transmission source communication device, by analyzing the collected reporting signals, is able to know what extent of user equipments the emergency information has reached properly. As a result, for example, measures for improving reception rates can be taken for areas with low reception rates. For example, by taking measures of increasing the number of repetitive broadcast information transmissions, increasing transmission power, reducing channel coding rate, reducing the modulation level of data modulation method, adjusting directional characteristics, increasing a number of base stations for sending broadcast information, etc., the reception rate for the broadcast information to be transmitted next time can be improved.

3. Transmission Source Communication Device

Figure 4:
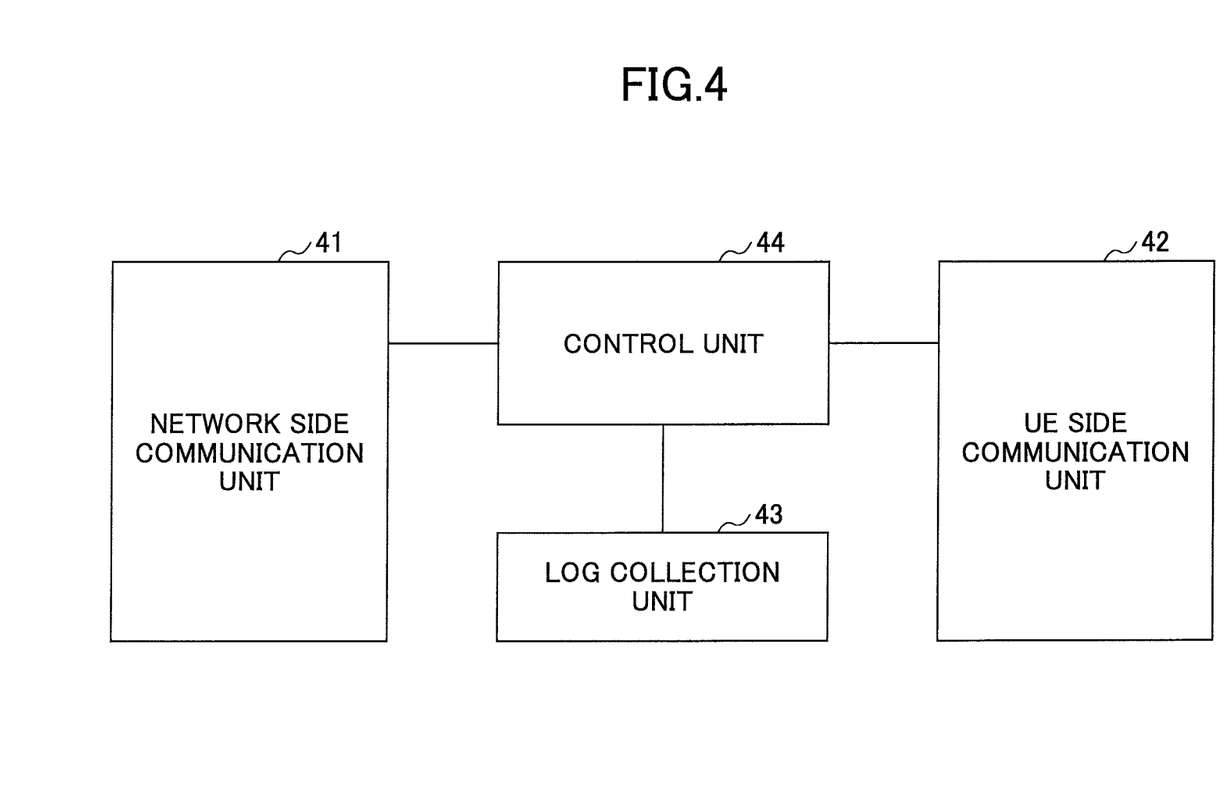
FIG. 4 is a functional block diagram of a transmission source communication device.

FIG. 4 illustrates a functional block diagram of the transmission source communication device. As described above, a transmission source communication device may be a base station (eNB, NodeB), a Radio Network Controller (RNC), a switching center (MME), a network server, etc. In FIG. 4, of various function units or processing units included in the communication device, those especially related to the present embodiment are shown. The communication device includes at least a network side communication unit 41, a UE side communication unit 42, a log collection unit 43 and a control unit 44.

The network side communication unit 41 receives broadcast information from an upper node. The broadcast information may be received together with information specifying a broadcast area. In the case where the transmission source communication device is a base station, the upper node is a Radio Network Controller (RNC) or a switching center (MME). In the case where the transmission source communication device is a Radio Network Controller RNC, the upper node is a Cell Broadcast Center CBC.

The UE side communication unit 42 includes a function sending signals to user equipments and a function receiving signals from user equipments. The signals to be sent to user equipments include an instruction signal to instruct keeping records of broadcast information, a signal including broadcast information, a signal to request for records regarding broadcast information, etc. The signals to be received from user equipments are a notification signal indicating that records are retained, a reporting signal including recorded contents retained by user equipments, etc.

The log collection unit 43 retains records collected from reporting signals received from user equipments.

The control unit 44 controls operations in the transmission source communication device. Of operations described referring to FIG. 2, the control unit 44 enables the communication device to perform a portion of operations related to the transmission source communication device.

4. User Equipment

Figure 5:
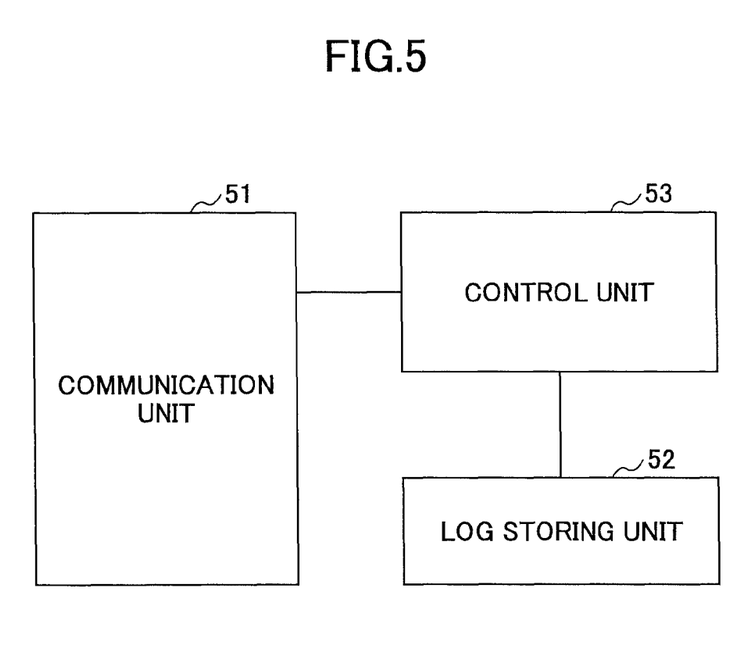
FIG. 5 is a functional block diagram of a user equipment.

FIG. 5 illustrates a functional block diagram of the user equipment. In FIG. 5, of various function units or processing units included in the user equipment, those especially related to the present embodiment are shown. The user equipment includes at least a communication unit 51, a log storing unit 52 and a control unit 53.

The communication unit 51 includes a function receiving signals from the transmission source communication device, and a function sending signals towards the transmission source communication device. The signals received from the transmission source communication device include an instruction signal to instruct keeping records of broadcast information, a signal including broadcast information, a signal to request for records regarding broadcast information, etc. The signals sent towards the transmission source communication device include a notification signal indicating that records are retained, a reporting signal including contents of records retained, etc.

The log storing unit 52 retains records (logs) obtained from the broadcast information.

The control unit 53 controls operations in the user equipment. Of operations described referring to FIG. 2, the control unit 53 enables the user equipment to perform a portion of operations related to the user equipment.

5. Modified Embodiments

The communication system shown in FIG. 1 includes the LTE scheme mobile communication system and the third generation scheme mobile communication system, which is not essential. More in general, the communication system shown in FIG. 1 may include any mobile communication system with a different Radio Access Technology (RAT). In the case of the user equipment that can operate with any of the multiple radio access technologies (RAT), the Radio Access Technology at the time of receiving instruction signals and the Radio Access Technology (RAT) at the time of reporting records may be the same or may be different. For example, the Radio Access Technology (RAT) of the mobile communication system at the time of receiving instruction in step S201 of FIG. 2 (for example, LTE scheme) may be different from the Radio Access Technology (RAT) of the mobile communication system at the time of reporting records in step S209 through S213 (for example, WCDMA scheme).

The present invention has been described above referring to specific embodiments, but each embodiment is used just as an example, and a person skilled in the art would easily understand various modified embodiments, amended embodiments and replacement embodiments. For example, the present invention may be applied to any appropriate mobile communication system in which information is broadcast. For example, the present invention may be applied to a W-CDMA scheme system, a HSDPA/HSUPA scheme W-CDMA system, an LTE scheme system, an LTE-advanced scheme system, an IMT-Advanced scheme system, a WiMAX, a Wi-Fi scheme system, etc. For the sake of convenience, the present embodiments are described using specific numbers in order to facilitate understanding of the invention, but these numbers are used just as examples and, unless otherwise noted, any appropriate number can be used. Division of embodiments or items is not essential for the present invention, and things described in more than one items may be used in combination as necessary, or a thing described in an item may be applied to a thing described in a different item (as long as it does not conflict). For the sake of convenience, devices of the present embodiments are described using a functional block diagram, but those devices may be realized as hardware, software, or combination of both. The software may be provided in a Random Access Memory (RAM), a Flash memory, a Read-Only Memory (ROM), an EPROM, an EEPROM, a register, a hard disk (HDD), a removable disk, a CD-ROM, a database, a server, or any other memory media. The present invention is not limited to these embodiments, but various variations and modifications may be made without departing from the spirit of the present invention.

The present application is based on and claims the benefit of priority of Japanese Priority Application No. 2011-120839 filed on May 30, 2011 the entire contents of which are hereby incorporated by reference.

DESCRIPTION OF THE REFERENCE NUMERALS

11 Cell Broadcast Entity CBE
12 Cell Broadcast Center CBC
13 Switching center MME
14 Radio Network Controller RNC
15 Base station of LTE system eNB, base station of 3G system BS
16 User equipment
41 Network side communication unit
42 UE side communication unit
43 Log collection unit
44 Control unit
51 Communication unit
52 Log storing unit
53 Control unit

The invention claimed is:

1. A communication device comprising:
a receiving unit configured to receive an instruction signal, which instructs keeping of records regarding specific broadcast information, from a transmission source of the specific broadcast information,
a storing unit configured to retain the records regarding the specific broadcast information in that case where the receiving unit receives the specific broadcast information broadcast from the transmission source, and
a transmission unit configured to transmit to the transmission source a notification signal indicating that the records regarding the specific broadcast information are retained, wherein
in that case where receiving unit receives a request signal sent from the transmission source in response to the notification signal, the transmission unit transmits to the transmission source a reporting signal including at least an identifier identifying the specific broadcast information.

2. The communication device as claimed in claim 1, wherein the instruction signal includes, in addition to the identifier of the specific broadcast information, at least one of a time and a location when and where the specific broadcast information is received.

3. The communication device as claimed in claim 1, wherein the reporting signal includes, in addition to the identifier of the specific broadcast information, at least one of a time, a location and contents, when and where the specific broadcast information is received.

4. The communication device as claimed in claim 1, wherein the instruction signal is sent at a predefined time to a predefined area.

5. The communication device as claimed in claim 1, wherein the transmission source is a base station, a Radio Network Controller controlling the base station, a switching center or a network server.

6. A communication device comprising:
a transmission unit configured to broadcast, after transmitting to a user equipment an instruction signal instructing keeping of records regarding specific broadcast information, the specific broadcast information to the user equipment in a specific area, and
a receiving unit configured to receive a notification signal from the user equipment indicating that records regarding the specific broadcast information are retained, wherein
the receiving unit receives a reporting signal including at least an identifier identifying the specific broadcast information from the user equipment responding to a request signal sent by the transmission unit.

7. The communication device as claimed in claim 6, wherein the communication device is a base station, a Radio Network Controller controlling the base station, a switching center or a network server.

8. An information collecting method comprising:
transmitting an instruction signal, configured to instruct keeping of records regarding specific broadcast information from a transmission source of the specific broadcast information to a user equipment;
transmitting the specific broadcast information from the transmission source;
retaining the records regarding the specific broadcast information in the user equipment that receives the specific broadcast information;
transmitting a notification signal, configured to indicate that the records regarding the specific broadcast information are retained, from the user equipment to the transmission source;
transmitting a request signal from the transmission source to the user equipment in response to the notification signal; and
transmitting a reporting signal, configured to include an identifier identifying the specific broadcast information, from the user equipment to the transmission source.

* * * * *